(No Model.)
S. M. PERRY.
DUST PAN.
No. 260,119. Patented June 27, 1882.
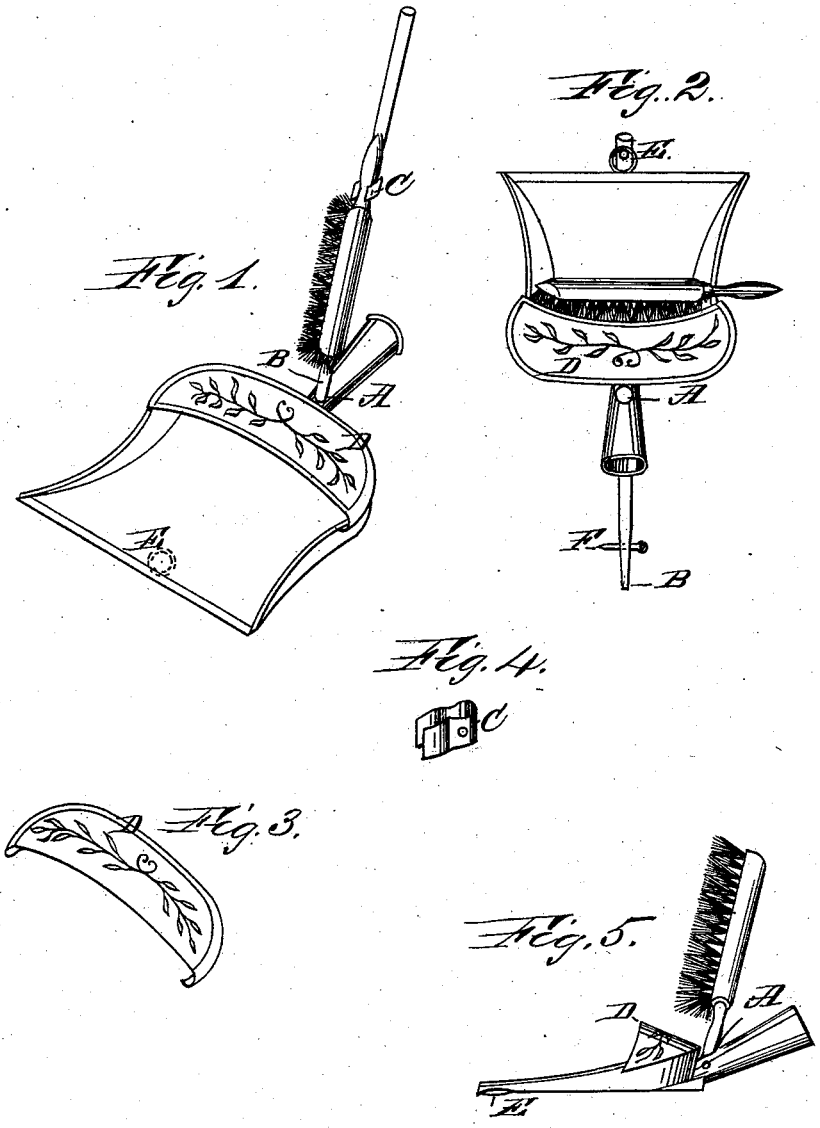
WITNESSES:
Thomas S. Hughes
Wm Kellner
INVENTOR
Samuel M. Perry
by his Attorney
H. L. Bennem.

UNITED STATES PATENT OFFICE.

SAMUEL M. PERRY, OF PLAINFIELD, NEW JERSEY.

DUST-PAN.

SPECIFICATION forming part of Letters Patent No. 260,119, dated June 27, 1882.

Application filed March 27, 1882. (No model.)

*To all whom it may concern:*

Be it known that I, SAMUEL M. PERRY, of Plainfield, in the county of Union and State of New Jersey, have made an invention of certain new and useful Improvements in Dust-Pans; and I do hereby declare that the following is a full, clear, and exact description and specification of the same.

The object of my improvements is to cheapen the expense in packing and shipping dust-pans, especially the short-handled hooded pans, and also the greater convenience in their general use.

The invention consists of certain combinations of mechanical devices which are recited in detail at the close of this specification.

In order that the invention may be fully understood, I have represented in the accompanying drawings and will proceed to describe a dust-pan embodying my invention in the best form thus far devised by me.

Figure 1 represents a perspective view of the dust-pan complete for use. Fig. 2 represents a plan or top view of the dust-pan suspended, together with the long detachable handle and the brush. Fig. 3 represents a perspective view of the hood. Fig. 4 represents a perspective view of the dust-brush supporter; and Fig. 5 represents a perspective view of the hooded dust-pan, showing a brush as a substitute for the long handle.

A is a socket, open at one or both ends, and made preferably to pass crosswise or diagonally through the shank of the short fixed handle and soldered thereto, the shank of the long detachable handle B passing into and being sustained by the same in a fixed position, a pin, F, or any other device, being used, if desired, as a fastening.

C is a dust-brush supporter, in this instance spring-clasp shape, made to attach to the long handle B, so that it may grip the sides of the brush-handle and hold it within convenient reach and out of the way when it is desired to use the pan with a broom.

D is a hood or cover for the back of the pan completely finished, and is detachable from the pan. Its construction is more particularly shown in Fig. 3, the edge of its sides and back being turned down and under sufficiently to grip the edge of the pan and by its springing qualities firmly hold it to same. The hood and the pan are preferably narrowed in toward their front to give them a superior hold on each other.

By this improvement, the hood being completely finished and japanned or ornamented separably from the pan in such manner that an unpracticed person can instantly attach the same to the pan after shipment, ready for use, the heretofore great expense of package and transportation and the injury incident thereto of the short-handled hooded dust-pan, with its cumbrous and delicate form, are avoided, as the detachable covers are nested and packed by themselves, the pan, like the usual unhooded pans, being packed in the same way.

E in Figs. 1 and 2 shows a movable suspension ring or hook connected centrally near the front edge of the pan, preferably on the under side of the bottom, in a hollow formed by the said edge, inclining downward. By this means the pan can be suspended by its front edge, particularly the hooded pan, throwing its ornamental parts outward, the hood thus becoming a convenient and tasteful receptacle for the pan-brush. This ring, when not used to suspend the pan, lies back on the bottom thereof, out of the way.

What I claim as new, and desire to secure by Letters Patent, is—

1. A dust-pan having therein the features of a bottom, sides, open front, and a short undetachable handle, in combination with an open socket, or socket recessed in such manner that when the pan rests upon the floor a straight detachable handle can be inserted in said recess, the said handle being entirely supported thereby in a nearly upright position, for purposes hereinbefore set forth.

2. The combination of a spring or other gripping-fingers with the long detachable handle of a dust-pan, whereby a brush may be supported by the same in a convenient position, for purposes herein set forth.

3. A hood or cover for the back of a dust-pan, as formed and finished separate or detachable from the pan, consisting of the japanned or ornamented surface, with a portion of its side and back edge turned down and a portion of said edge turned under, substantially as hereinbefore set forth.

4. The combination of a movable suspension ring or hook with the front edge of a dust-pan, for purposes herein set forth.

Witness my hand this 25th day of February, A. D. 1882.

SAML. M. PERRY.

Witnesses:
THOMAS I. HUGHES,
W. L. BENNEM.